US012771620B2

(12) United States Patent
Singh et al.

(10) Patent No.: US 12,771,620 B2
(45) Date of Patent: Oct. 20, 2026

(54) METHOD AND ELECTRONIC DEVICE FOR MANAGING MACHINE LEARNING SERVICES IN A WIRELESS COMMUNICATION NETWORK

(71) Applicant: SAMSUNG ELECTRONICS CO., LTD., Suwon-si (KR)

(72) Inventors: Sukhdeep Singh, Bangalore (IN); Joseph Thaliath, Bangalore (IN); Vivek Sapru, Bangalore (IN); Sandeep Kumar Jaisawal, Bangalore (IN); Naman Agarwal, Bangalore (IN); Seungil Yoon, Suwon-si (KR); Hoejoo Lee, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 324 days.

(21) Appl. No.: 17/863,576

(22) Filed: Jul. 13, 2022

(65) Prior Publication Data

US 2023/0031470 A1 Feb. 2, 2023

Related U.S. Application Data

(63) Continuation of application No. PCT/KR2022/009694, filed on Jul. 5, 2022.

(30) Foreign Application Priority Data

Jul. 30, 2021 (IN) ............................. 202141034308
Jun. 15, 2022 (IN) ............................. 202141034308

(51) Int. Cl.
*H04L 41/16* (2022.01)
*G06F 18/21* (2023.01)
(Continued)

(52) U.S. Cl.
CPC ............ *H04L 41/16* (2013.01); *G06F 18/217* (2023.01); *G06N 20/00* (2019.01); *H04L 41/5006* (2013.01); *H04W 48/18* (2013.01)

(58) Field of Classification Search
None
See application file for complete search history.

(56) References Cited

U.S. PATENT DOCUMENTS 11,012,872 B1 * 5/2021 Bellamkonda ...... H04L 41/0823
2015/0348065 A1 12/2015 Doganata et al.
(Continued)

FOREIGN PATENT DOCUMENTS

EP 3 668 007 6/2020
WO WO-2015032435 A1 * 3/2015 ....... G06F 17/30864
(Continued)

OTHER PUBLICATIONS

Search Report dated Oct. 7, 2022 in counterpart International Patent Application No. PCT/KR2022/009694.
(Continued)

*Primary Examiner* — Tonia L Dollinger
*Assistant Examiner* — Ishrat Rashid
(74) *Attorney, Agent, or Firm* — NIXON & VANDERHYE P.C.

(57) ABSTRACT

The embodiments herein disclose a method for managing machine learning (ML) services in a wireless communication network. The method includes: storing a plurality of ML packages, each executing a network service request; receiving a trigger based on the network service request from a server; determining a plurality of parameters corresponding to the network service request, on receiving the trigger from the server; determining an ML package based on the trigger and the plurality of parameters corresponding to the network
(Continued)

service request; and deploying the determined at least one ML package for executing the network service request.

16 Claims, 9 Drawing Sheets

(51) Int. Cl.

| | |
|---|---|
| ***G06N 20/00*** | (2019.01) |
| ***H04L 41/5006*** | (2022.01) |
| ***H04W 48/18*** | (2009.01) |

(56) References Cited

U.S. PATENT DOCUMENTS

| | | | | |
|---|---|---|---|---|
| 2019/0132708 | A1 | 5/2019 | Belghoul et al. | |
| 2019/0156246 | A1* | 5/2019 | Kuo | G06N 5/04 |
| 2019/0349254 | A1 | 11/2019 | Nolan et al. | |
| 2020/0175416 | A1* | 6/2020 | Zhao | G06N 20/00 |
| 2020/0313985 | A1* | 10/2020 | Jayakumar | H04L 41/149 |
| 2020/0380301 | A1* | 12/2020 | Siracusa | G06N 20/00 |
| 2021/0051060 | A1 | 2/2021 | Parvataneni et al. | |
| 2021/0211352 | A1* | 7/2021 | Parvataneni | H04L 43/0876 |
| 2021/0264025 | A1* | 8/2021 | Givental | G06F 18/214 |
| 2021/0295204 | A1* | 9/2021 | Bhide | G06N 5/04 |
| 2021/0367892 | A1* | 11/2021 | Young | H04L 47/627 |
| 2022/0038349 | A1* | 2/2022 | Li | G06N 3/08 |
| 2022/0053375 | A1* | 2/2022 | Asawa | H04L 41/0806 |
| 2022/0114401 | A1* | 4/2022 | Cmielowski | G06F 18/214 |
| 2022/0164701 | A1* | 5/2022 | Shrivastava | G06F 21/6218 |
| 2024/0096155 | A1* | 3/2024 | Sachdeva | G07C 9/28 |

FOREIGN PATENT DOCUMENTS

| | | |
|---|---|---|
| WO | 2019/103999 | 5/2019 |
| WO | 2021/094910 | 5/2021 |

OTHER PUBLICATIONS

Written Opinion dated Oct. 7, 2022 in counterpart International Patent Application No. PCT/KR2022/009694.

Indian Office Action issued Mar. 18, 2024 in corresponding Indian Patent Application No. 202141034308.

* cited by examiner

METHOD AND ELECTRONIC DEVICE FOR MANAGING MACHINE LEARNING SERVICES IN A WIRELESS COMMUNICATION NETWORK

CROSS-REFERENCE TO RELATED APPLICATIONS

This application is a continuation of International Application No. PCT/KR2022/009694, filed on Jul. 5, 2022, in the Korean Intellectual Property Receiving Office and claiming priority to Indian Provisional patent application number 202141034308, filed on Jul. 30, 2021, in the Indian Patent Office, and to Indian Complete patent application number 202141034308, filed on Jun. 15, 2022, in the Indian Patent Office, the disclosures of each of which are incorporated by reference herein in their entireties.

BACKGROUND

Field

The disclosure relates machine learning (ML) services and for example, is related to a method and an electronic device for managing ML services in wireless communication network.

Description of Related Art 5G is a service based architecture in which 100s to 1000's of services are deployed under same umbrella. As a result, management of a network and understanding patterns manually is a cumbersome task. Therefore, operators require artificial intelligence (AI) and/or machine learning (ML) based solutions which can understand and predict a problem in advance so that the operator can take decisions to mitigate the problem in advance. However, in large countries there is millions of base station and trillions of devices in the network but ML resources are limited (owing to CAPEX (capital expenditure) and OPEX (operating expenditure)). The operator needs to balance out these resources judiciously in order to mitigate the problem at various cities in different parts of the country. Therefore, current manual intelligent solutions which still are dependent on the human intervention of choosing the ML resources and models may not prove beneficial for the operator. For millions of base stations and billions of devices operator might be able to spend only on some thousands of base stations for ML resources. The operator needs to keep rotating the resources as per the site demands in the network.

Owing to lots of heterogeneous services and the devices generating diverse traffic patterns it is necessary to choose the appropriate ML models and optimal amount of resources as per the current ML resource usage in the network. Keeping in the mind, availability of ML resources in the network and the service we are serving and the type of problem we have to address using ML/AI, we also need to declare the ML periodicity (e.g., after how much interval we need to collect the data and how frequent we need to do training and prediction), the bearable error limit and accuracy of the model required. Provisioning of the above things manually is very difficult and can lead to inappropriate non-optimal model selection and ML resource allocation which can further lead to choosing of non-optimal solution to mitigate the problem which might cause subscriber loss or degradation of QoS/QoE in the network or increase in OPEX of the network operator. Therefore, there is a need to automate the process of ML model, related parameters (like periodicity, errors and accuracies) and ML resource provisioning.

SUMMARY

Embodiments of the disclosure provide a method and an electronic device for automatically managing machine learning (ML) services in wireless communication network. The automation of ML package selection from a ML repository based on various parameters enables selection on an optimized ML package based on requirements of a service request. As a result, ML resources available at an operator's side are judiciously utilized.

Accordingly, an embodiment herein discloses a method for managing machine learning (ML) services by an electronic device in a wireless communication network. The method may include storing a plurality of ML packages. Each of the plurality of ML packages executes at least one network service request. The method may include receiving a trigger based on the at least one network service request from a server. The method may include determining a plurality of parameters corresponding to the at least one network service request, in response to receiving the trigger from the server. The method may include determining at least one ML package from the plurality of ML packages based on the trigger and the plurality of parameters corresponding to the at least one network service request; and deploying the determined at least one ML package for executing the at least one network service request.

In an embodiment, the trigger based on the at least one network service request may indicate at least one of: formation of a new network slice and an anomaly corresponding to the new network slice; and a scenario of a service level assurance (SLA) provided by a network operator not being met.

The plurality of parameters corresponding to the at least one network service request may comprise information of service profile of a network, ML requirements of the at least one network operator, network traffic pattern for a specific service and unfilled ML templates associated with the specific service.

In an embodiment, the network traffic pattern for a specific service is determined by receiving the information of service profile of the network and the ML requirements of the at least one network operator as inputs; and determining a plurality of network elements exhibiting same network traffic pattern over a period of time. The method may include grouping each of the plurality of network elements exhibiting the same network traffic pattern over the period of time, training one among each of the plurality of network elements exhibiting the same network traffic pattern using a specific training model, and instructing an ML orchestrator to train rest of the plurality of network elements exhibiting the same network traffic pattern using the specific training model used by the ML services management controller for training the one network element, wherein the use of the specific training model used by the ML services management controller for training the one network element, to train the rest of the plurality of network elements results in saving of ML resources used for training.

In an embodiment, each of the plurality of ML packages comprises at least one of: a predicted requirement of the network resources for implementing a ML technique, predicted optimal ML model and related libraries, an error prediction window, periodicity of predicting the error, at least one of: a training accuracy and a prediction accuracy.

In an embodiment, determining the at least one ML package from the plurality of ML packages based on the trigger and the plurality of parameters corresponding to the at least one network service request may include inputting the trigger received from the server and the plurality of parameters corresponding to the at least one network service request to one of a deep reinforcement leaning engine and deep dynamic learning engine; and determining the at least one ML package of the plurality of ML packages based on the trigger and the plurality of parameters corresponding to the at least one network service request by one of the deep reinforcement leaning engine and the deep dynamic learning engine. The method may include filling values corresponding to the determined at least one ML package in at least one unfilled ML template associated with the specific service.

In an embodiment, the method may include monitoring a plurality of network service requests from the server; and identifying one or more network service requirements associated with each of the network service requests. The method may includes monitoring one or more machine learning packages deployed from the ML model repository in response to each of the network service requests from the plurality of network service requests; and generating a co-relation between each of the network service request, the corresponding network service requirements and the one or more machine learning packages deployed from the ML model repository for optimization of each network service over a period of time. The method may includes receiving an incoming network service request; and deploying the ML package corresponding to the network service requirements of the incoming network service request based on the generated co-relation.

Accordingly, an embodiment herein discloses an electronic device for managing machine learning (ML) services in a wireless communication network. The ML services management controller includes: a memory, and at least one processor coupled to the memory. The at least one processor may be configured to: store a plurality of ML packages. Each of the plurality of ML package executes at least one network service request. The at least one processor may be configured to receive a trigger based on the at least one network service request from a server. The at least one processor may be configured to determine a plurality of parameters corresponding to the at least one network service request, in response to receiving the trigger from the server. The at least one processor may be configured to determine at least one ML package from the plurality of ML packages based on the trigger and the plurality of parameters corresponding to the at least one network service request. The at least one processor may be configured to deploy the determined at least one ML package for executing the at least one network service request.

Accordingly, an embodiment herein discloses a non-transitory computer-readable storage medium storing instructions. The instructions, when executed by at least one processor of an electronic device for managing machine learning (ML) services, cause the electronic device to perform operations. The operations may comprise storing a plurality of ML packages. Each of the plurality of ML packages executes at least one network service request. The operations may comprise receiving a trigger based on the at least one network service request from a server. The operations may comprise determining a plurality of parameters corresponding to the at least one network service request, in response to receiving the trigger from the server. The operations may comprise determining at least one ML package from the plurality of ML packages based on the trigger and the plurality of parameters corresponding to the at least one network service request; and The operations may comprise deploying the determined at least one ML package for executing the at least one network service request.

These and other aspects of the various example embodiments herein will be better appreciated and understood when considered in conjunction with the following description and the accompanying drawings. It should be understood, however, that the following descriptions, while indicating example embodiments and numerous specific details thereof, are given by way of illustration and not of limitation. Many changes and modifications may be made within the scope of the disclosure herein without departing from the spirit thereof, and the embodiments herein include all such modifications.

BRIEF DESCRIPTION OF THE DRAWINGS

The method and the device are illustrated in the accompanying drawings, throughout which reference letters indicate corresponding parts in the various figures. The above and other aspects, features and advantages of certain embodiments of the present disclosure will be more apparent from the following detailed description, taken in conjunction with the accompanying drawings, in which.

DETAILED DESCRIPTION

Figure 1A:
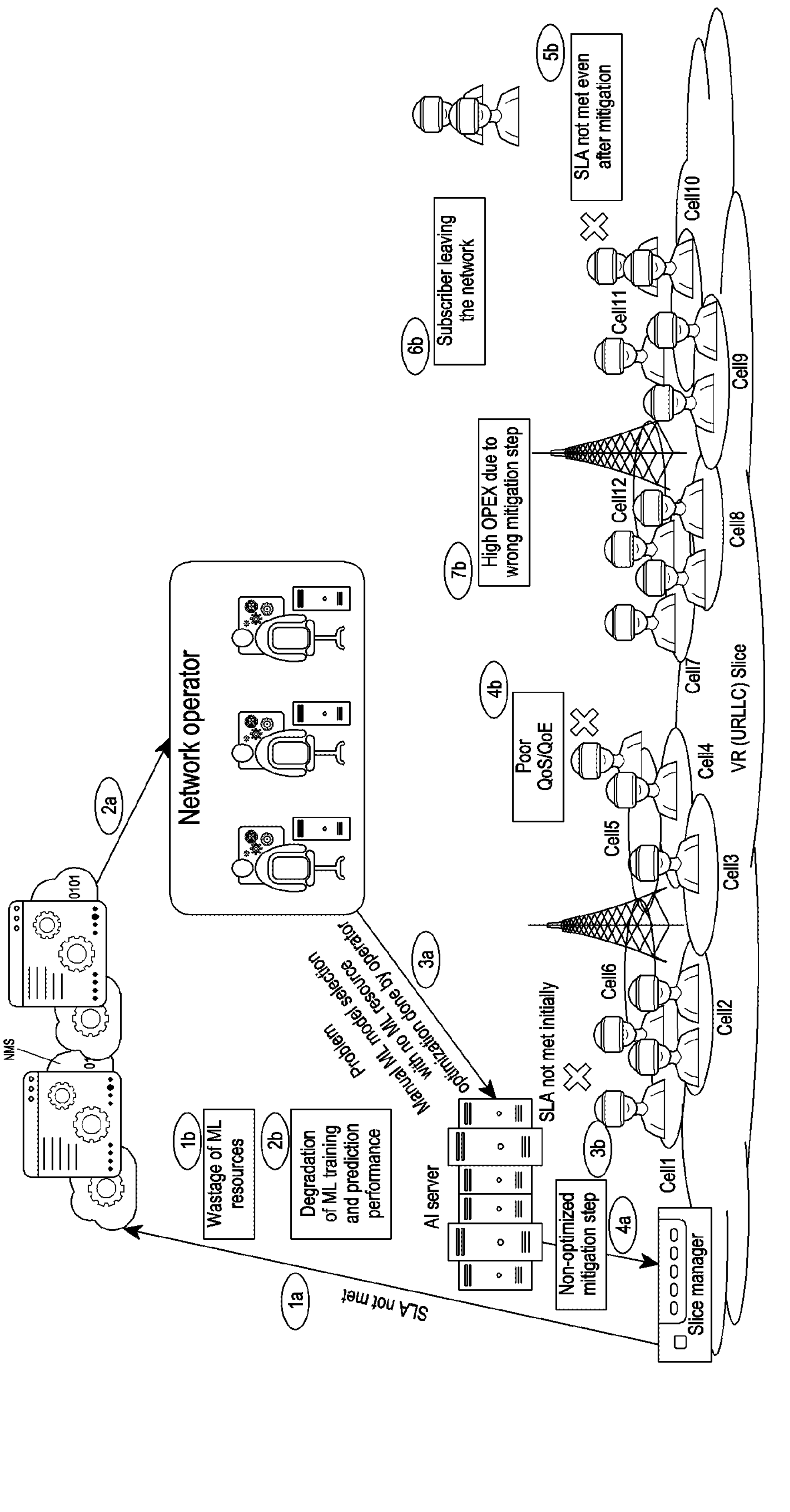
FIG. 1A (PRIOR ART)
FIGS. 1A and 1B are diagrams illustrating an example of managing services in a wireless communication network, according to a prior art.

The example embodiments herein and the various features and advantageous details thereof are explained more fully with reference to the non-limiting embodiments that are illustrated in the accompanying drawings and detailed in the following description. Descriptions of well-known components and processing techniques may be omitted so as to not unnecessarily obscure the disclosure. The various embodiments described herein are not necessarily mutually exclusive, as various embodiments can be combined with one or more other embodiments to form new embodiments. The term "or" as used herein, refers to a non-exclusive or, unless otherwise indicated. The examples used herein are intended merely to facilitate an understanding of ways in which the embodiments herein can be practiced and to further enable those skilled in the art to practice the embodiments herein. Accordingly, the examples should not be construed as limiting the scope of the embodiments herein.

The example embodiments may be described and illustrated in terms of blocks which carry out a described function or functions. These blocks, which may be referred to herein as managers, units, controllers, hardware components or the like, are physically implemented by analog and/or digital circuits such as logic gates, integrated circuits, microprocessors, microcontrollers, memory circuits, passive electronic components, active electronic components, optical components, hardwired circuits and the like, and may optionally be driven by firmware. The circuits may, for example, be embodied in one or more semiconductor chips, or on substrate supports such as printed circuit boards and the like. The circuits of a block may be implemented by dedicated hardware, or by a processor (e.g., one or more programmed microprocessors and associated circuitry), or by a combination of dedicated hardware to perform some functions of the block and a processor to perform other functions of the block. Each block of the embodiments may be physically separated into two or more interacting and discrete blocks without departing from the scope of the disclosure. Likewise, the blocks of the embodiments may be physically combined into more complex blocks without departing from the scope of the disclosure.

The accompanying drawings are provided to help easily understand various technical features and it should be understood that the embodiments presented herein are not limited by the accompanying drawings. As such, the present disclosure should be understood to extend to any alterations, equivalents and substitutes in addition to those which are particularly set out in the accompanying drawings. Although the terms first, second, etc. may be used herein to describe various elements, these elements should not be limited by these terms. These terms are generally only used to distinguish one element from another.

Accordingly, the various example embodiments herein disclose a method for managing machine learning (ML) services in a wireless communication network. The method includes configuring, by a ML services management controller, a repository of a plurality of ML packages and providing, by the ML services management controller, an access to the repository to at least one network operator. Each ML package executes at least one network service request based on a pre-defined service requirement. The method also includes receiving, by the ML services management controller, a trigger from a Network Management Server (NMS) based on the at least one network service request and determining, by the ML services management controller, a plurality of parameters corresponding to the received at least one network service request, in response to receiving the trigger from the NMS. Further, the method also includes determining, by the ML services management controller, at least one ML package from the plurality of ML packages in the repository based on the trigger and the plurality of parameters corresponding to the received at least one network service request; and automatically deploying, by the ML services management controller, the selected ML package for executing the at least one of the network service request.

Accordingly, various example embodiments herein disclose a machine learning (ML) services management controller for managing services in a wireless communication network. The ML services management controller includes a memory, a processor, a communicator and a ML services manager. The ML services manager is configured to configure a repository of a plurality of ML packages and provide an access to the repository to at least one network operator. Each ML package executes at least one network service request based on a pre-defined (e.g., specified) service requirement. The ML services manager is also configured to receive a trigger from a Network Management Server (NMS) based on the at least one network service request and determine a plurality of parameters corresponding to the received at least one network service request, in response to receiving the trigger from the NMS. Further, the ML services manager is also configured to determine at least one ML package from the plurality of ML packages in the repository based on the trigger and the plurality of parameters corresponding to the received at least one network service request; and automatically deploy the selected ML package for executing the at least one of the network service request.

Unlike to the conventional methods and systems, in the disclosed method an operator saves on CAPEX (e.g., capital expense) and OPEX (e.g., operational expense) due to intelligence. In large countries the operators will have to conventionally spend large amount of money on ML resources and servers. Therefore, automation will save time. Also, training time can be enhanced to get more accuracy.

Network slicing will be deployed for 5G networks in the near future. There exists an idea which talks about implementation of machine learning to optimize the networks. Machine learning is implemented manually (not scalable) where; training models, requirement for ML and ML model deployments are performed by operators or service providers. In large scale networks the aforesaid task becomes resource as well as time consuming. MaaS for NaaS automate the resource provisioning (provide it as a service) for ML deployment/training/predication based on: 1) Slice/use case (combination of services) 2) Region 3) Network traffic pattern classifications 4) Operator policies and provide the 1) ML and cloud resources 2) ML model 3) ML prediction error 4) ML prediction periodicity; to automate the ML deployment process.

Figure 1B:
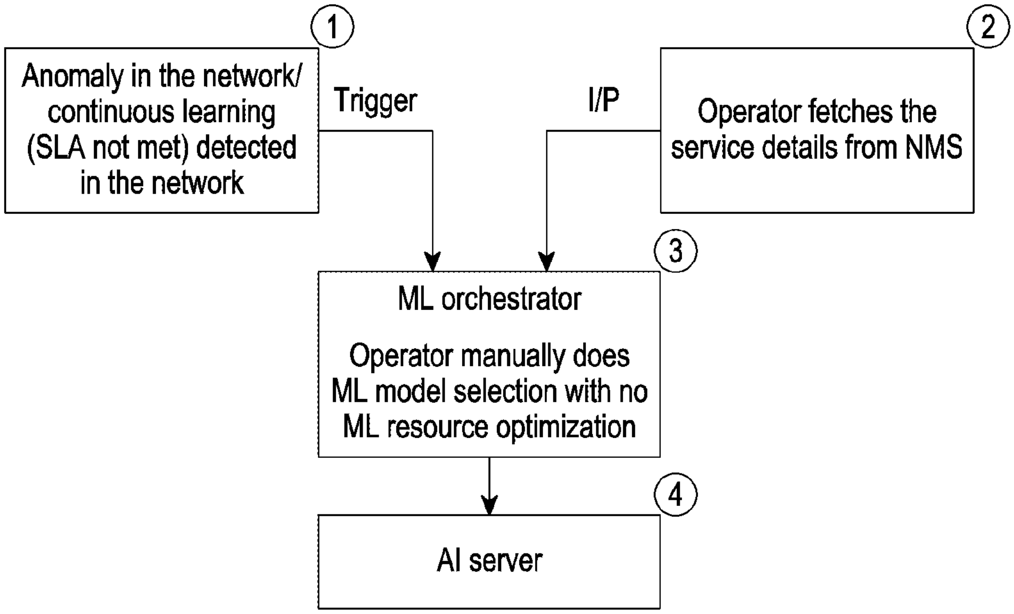
FIG. 1B (PRIOR ART)

FIGS. 1A and 1B are diagrams illustrating managing services in a wireless communication network by manual selection of ML packages, according to a prior art. Referring to FIG. 1A, at 1*a*, a slice manager determines that a service level assurance (SLA) is not met and informs the same to the NMS. At 2*a*, a service profile comprising slice/Service id, location, operator policies, anomaly id, anomaly type, KPI list is shared by the NMS to the network operator. At 3*a*, a ML model is manually selected with no ML resource optimization done by the network operator. As a result, at 4*a*, a non-Optimized mitigation operation is perfumed. Therefore, the consequences include:

1*b*. Considering a 5G network, there are large number of services and large number of cells generating humungous data then manual selection of the ML packages can lead to selection of non-optimal or sub-optimal ML package.

2*b*. Sub-optimal/non-optimal ML package selection can further lead to sub-optimal ML resource utilization and can degrade the ML training and prediction performance.

3*b*. Degradation of training and prediction performance can lead to selection on non-optimal or sub-optimal mitigation solution 4*b*. Selection of the sub-optimal or non-optimal mitigation solution can cause the problem to still persist which may lead to poor QoS/QoE (refer next slide).

5*b*. Selection of sub-optimal or non-optimal mitigation solution can lead to condition where operators are not able to meet service level agreements (SLA)

6*b*. Poor QoS/QoE or SLA not met for the service may lead to subscriber churning (subscriber leaving the network due to poor services)

7*b*. Selection of the sub-optimal or non-optimal mitigation solution can also increase the OPEX of the operator.

Referring to FIG. 1B, at 1, the NMS receives trigger from the slice manager that the anomaly is detected in the network or continuous learning identifies that the SLA is not met for a specific slice in the network. At 2, the operator fetches the service details from the NMS. The service details may include for example but not limited to: slice/service id, location, operator policies, anomaly id, anomaly type, KPI list, etc.

At 3, at the ML Orchestrator the operator manually selects the ML model with no ML resource optimization. At 4, the non-optimal ML service deployment plan is provided to the AI Server. Therefore, in the conventional methods and systems for ML deployment, as part of the ML orchestration a service engineer need to MANUALLY select the right ML package for different service in different locations. Since the ML packages are manually selected by the service engineer the ML package is not the best package as a result the ML resource allocation is not efficient.

Referring now to the drawings and more particularly to FIGS. 2 through 9 where similar reference characters denote corresponding features consistently throughout the figures, there are illustrated and described various example embodiments.

Figure 2:
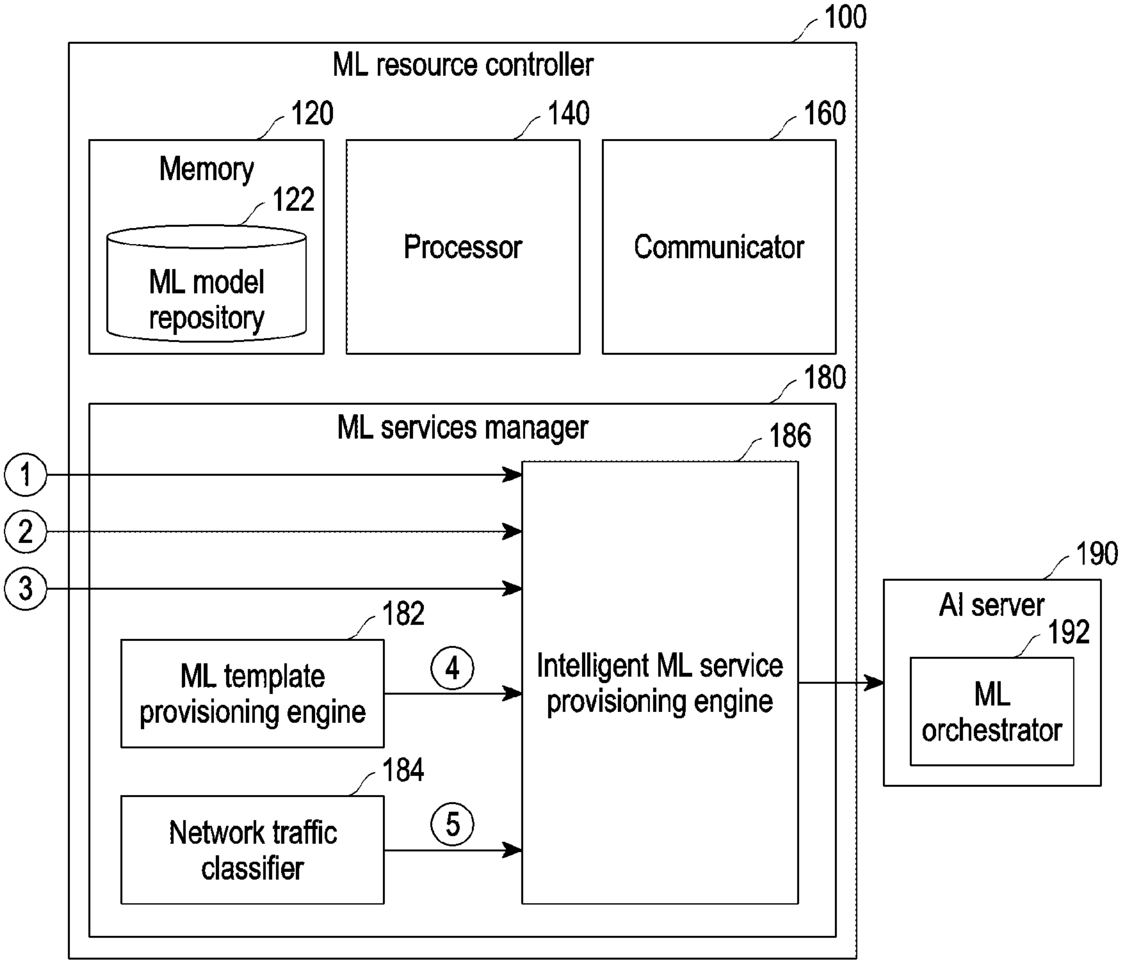
FIG. 2 is a block diagram illustrating an example configuration of an ML services management controller for managing services in a wireless communication network, according to various embodiments.

FIG. 2 is a block diagram illustrating an example configuration of a ML services management controller (100) for managing services in a wireless communication network, according to various embodiments.

The ML services management controller may be implemented in an electronic device.

Referring to FIG. 2, the ML services management controller (100) includes a memory (120), a processor (e.g., including processing circuitry) (140), a communicator (e.g., including communication circuitry) (160) and a ML services manager (e.g., including various processing circuitry and/or executable program instructions) (180). The processor (140) and the ML service manager (180) may be integrally referred to as at least one processor.

The memory (120) includes a ML model repository (122) which includes a plurality of ML packages. The memory (120) also stores instructions to be executed by the processor (140) for managing the ML services in the wireless communication network. The memory (120) storage elements may include magnetic hard discs, optical discs, floppy discs, flash memories, or forms of electrically programmable memories (EPROM) or electrically erasable and programmable (EEPROM) memories. In addition, the memory (120) may, in some examples, be considered a non-transitory storage medium. The term "non-transitory" may indicate that the storage medium is not embodied in a carrier wave or a propagated signal. However, the term "non-transitory" should not be interpreted that the memory (120) is non-movable. In various examples, the memory (120) can be configured to store larger amounts of information than the memory. In certain examples, a non-transitory storage medium may store data that can, over time, change (e.g., in Random Access Memory (RAM) or cache). The memory (120) can be an internal storage or it can be an external storage unit of the electronic device (100), cloud storage, or any other type of external storage.

In an embodiment, the processor (140) may include various processing circuitry and communicates with, the memory (120), the communicator (160) and the multi-connectivity enabler (104). The processor (140) is configured to execute instructions stored in the memory (120) for enabling multi-connectivity to avoid the jitters/RLFs/. The processor (140) may include one or a plurality of processors, may be a general purpose processor, such as a central processing unit (CPU), an application processor (AP), or the like, a graphics-only processing unit such as a graphics processing unit (GPU), a visual processing unit (VPU), and/or an Artificial intelligence (AI) dedicated processor such as a neural processing unit (NPU).

In an embodiment, the communicator (160) may include various communication circuitry and is configured for communicating internally between internal hardware components and with external devices via one or more networks. The communicator (160) includes an electronic circuit specific to a standard that enables wired or wireless communication.

In an embodiment, the ML services manager (180) includes a ML template provisioning engine (182), a network traffic classifier (184) and an intelligent ML service provisioning engine (186).

In an embodiment, the ML services manager (180) is configured to configure a repository of a plurality of ML packages and provide an access to the repository to at least one network operator. Each ML package executes at least one network service request based on a pre-defined service requirement. Further, the ML services manager (180) is configured to receive a trigger from a Network Management Server (NMS) based on the at least one network service request and determine a plurality of parameters corresponding to the received at least one network service request (received in operations 2, 3, 4 and 5), in response to receiving the trigger from the NMS. Further, the ML services manager (180) is configured to determine at least one ML package from the plurality of ML packages in the repository based on the trigger and the plurality of parameters corresponding to the received at least one network service request and automatically deploy the selected ML package for executing the at least one of the network service request. The plurality of parameters corresponding to the received at least one network service request comprises information of service profile of the network, ML requirements of the at least one network operator, network traffic pattern for a specific service and unfilled ML templates associated with the specific service.

In an embodiment, the network traffic classifier (184) is configured to receive the information of service profile of the network and the ML requirements of the at least one network operator as inputs and determine a plurality of network elements exhibiting same network traffic pattern over a period of time. Further, the network traffic classifier (184) is configured to group each of the plurality of network elements exhibiting the same network traffic pattern over the period of time and train one among each of the plurality of network elements exhibiting the same network traffic pattern using a specific training model. The network traffic classifier (184) is configured to instruct a ML orchestrator (192) to train rest of the plurality of network elements exhibiting the same network traffic pattern using the specific training model used by the ML services management controller (100) for training the one network element, wherein the use of the specific training model used by the ML services management controller (100) for training the one network element, to train the rest of the plurality of network elements results in saving of ML resources used for training Each ML package comprises at least one of: a predicted requirement of the network resources for implementing a ML technique, predicted optimal ML model and related libraries, an error prediction window, periodicity of predicting the error, at least one of: a training accuracy and a prediction accuracy.

In an embodiment, the intelligent ML service provisioning engine (186) is configured to receive a trigger from the NMS (operation 1). The NMS receives the trigger from a slice manager which is then sent to the intelligent ML service provisioning engine (186). The trigger is initiated based on the at least one network service request indicates at least one of: formation of a new network slice and an anomaly corresponding to the new network slice; and a scenario of the SLA provided by the network operator not being met. At operation 2, the intelligent ML service provisioning engine (186) is configured to receive a Service Profile from the NMS to create a ML service deployment plan. The Service Profile comprises service properties for example but not limited to slice/service id, location/region and operator policies. At operation 3, the intelligent ML service provisioning engine (186) is configured to receive ML requirements from an operator from the NMS. The ML requirements for example includes but may not be limited to anomaly id, anomaly type, current ML resource usage for different regions, KPI list for optimization of a service, etc. The ML requirements are run time value of the ML resource usage of the operator to the intelligent ML service provisioning engine (186). Further, based on the inputs received at operation 2 and operation 3, the intelligent ML service provisioning engine (186) requests for possible network traffic patterns classification from the network traffic classifier (184) that is in turn shared as input to the intelligent ML service provisioning engine (186) by the network traffic classifier (184) (operation 4).

In an embodiment, the ML template provisioning engine (182) is configured to share at least one ML template as an input to the intelligent ML service provisioning engine (186) on determining that the trigger is received, based on the service type and the service id.

The intelligent ML service provisioning engine (186) is then configured to perform one of reinforcement learning or dynamic deep learning to come up with a ML service based on the inputs received at operation 1, operation 2 and operation 3. The ML service comprises ML model, ML prediction error window, ML prediction periodicity, ML training/prediction accuracies. In parallel, the intelligent ML service provisioning engine (186) is also configured to predict future ML resources (hardware, software and cloud) in the operator network so that appropriate ML resources can be allocated to the current ML task requested by the operator. The ML resource usage value is in percentage. The operator manages the ML resources across services or across cells based on the ML resource usage value. This is operator specific implementation based on the ML resource allocation and the deployments in the operator network. Further, the values corresponding to the determined ML package is filled in the unfilled ML template associated with the specific service received as input at operation 4 from the ML template provisioning engine (182) and the ML service provisioning plan is be shared as an output to an AI server (190).

In an embodiment, the intelligent ML service provisioning engine (186) is configured to monitor a plurality of network service requests from the NMS and identify one or more network service requirements associated with each of the network service requests. Further, the intelligent ML service provisioning engine (186) is configured to monitor one or more machine learning packages deployed from the ML model repository in response to each of the network service requests from the plurality of network service requests and generate a co-relation between each of the network service request, the corresponding network service requirements and the one or more machine learning packages deployed from the ML model repository for optimization of each network service over a period of time. Furthermore, the intelligent ML service provisioning engine (186) is configured to receive an incoming network service request; and automatically deploy the ML package corresponding to the network service requirements of the incoming network service request based on the generated co-relation.

Although FIG. 2 shows various hardware components of the ML services management controller (100), it is to be understood that various embodiments are not limited thereon. In various embodiments, the ML services management controller (100), the may include less or more number of components. Further, the labels or names of the components are used only for illustrative purpose and does not limit the scope of the disclosure. One or more components can be combined together to perform same or substantially similar function for managing the ML services in the wireless communication network.

Figure 3:
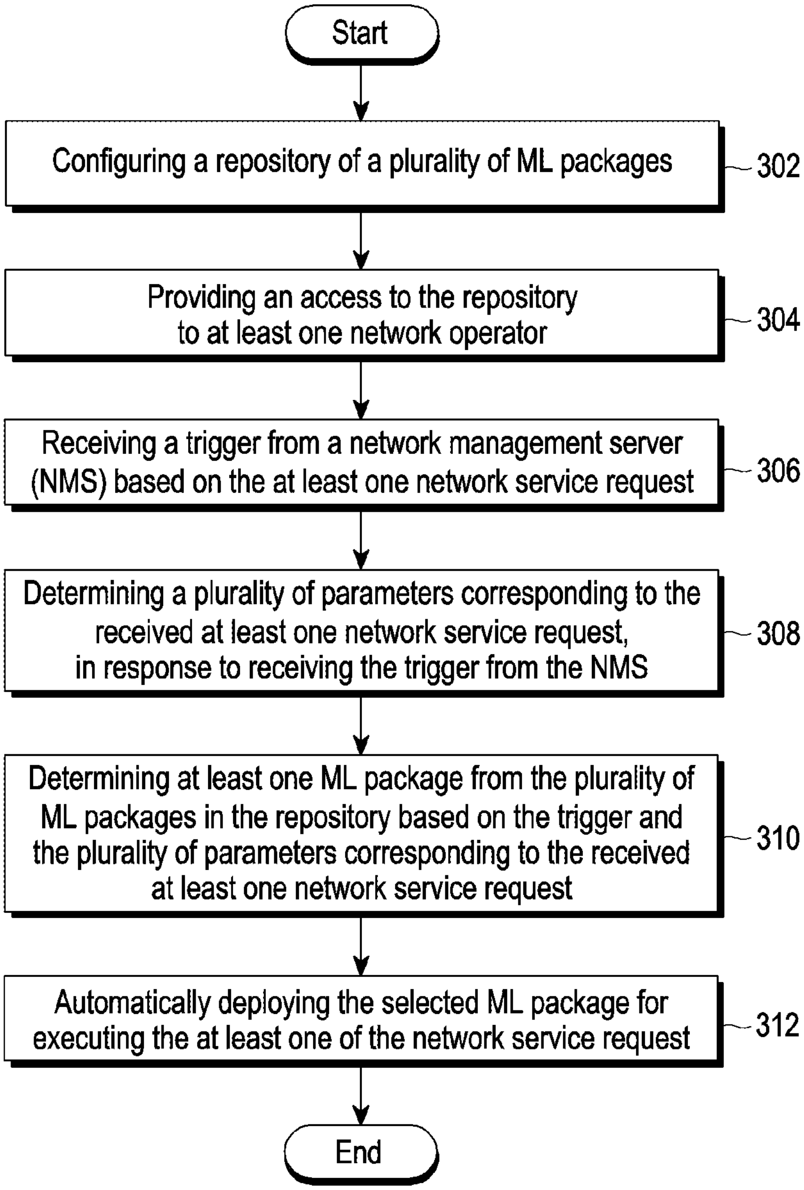
FIG. 3 is a flowchart illustrating an example method for managing the services in the wireless communication network, according to various embodiments.

FIG. 3 is a flowchart (300) illustrating an example method for managing the ML services in the wireless communication network, according to various embodiments.

Referring to FIG. 3, at operation 320, the method includes the ML services management controller (100) configuring the repository of the plurality of ML packages. For example, in the ML services management controller (100) as illustrated in FIG. 2, the ML services manager (180) is configured to configure the repository of the plurality of ML packages.

At operation 304, the method includes the ML services management controller (100) providing the access to the repository to at least one network operator. For example, in the ML services management controller (100) as illustrated in FIG. 2, the ML services manager (180) is configured to provide the access to the repository to at least one network operator.

At operation 306, the method includes the ML services management controller (100) receiving the trigger from the Network Management Server (NMS) based on the at least one network service request. For example, in the ML services management controller (100) as illustrated in FIG. 2, the ML services manager (180) is configured to receive the trigger from the Network Management Server (NMS) based on the at least one network service request.

At operation 308, the method includes the ML services management controller (100) determining the plurality of parameters corresponding to the received at least one network service request, in response to receiving the trigger from the NMS. For example, in the ML services management controller (100) as illustrated in FIG. 2, the ML services manager (180) is configured to determine the plurality of parameters corresponding to the received at least one network service request, in response to receiving the trigger from the NMS.

At operation 310, the method includes the ML services management controller (100) determining the at least one ML package from the plurality of ML packages in the repository based on the trigger and the plurality of parameters corresponding to the received at least one network service request. For example, in the ML services management controller (100) as illustrated in FIG. 2, the ML services manager (180) is configured to determine the at least one ML package from the plurality of ML packages in the repository based on the trigger and the plurality of parameters corresponding to the received at least one network service request.

At operation 312, the method includes the ML services management controller (100) automatically deploying the selected ML package for executing the at least one of the network service request. For example, in the ML services management controller (100) as illustrated in FIG. 2, the ML services manager (180) is configured to automatically deploy the selected ML package for executing the at least one of the network service request.

The various actions, acts, blocks, steps, operations or the like in the flow diagram may be performed in the order presented, in a different order or simultaneously. Further, in various embodiments, some of the actions, acts, blocks, steps, or the like may be omitted, added, modified, skipped, or the like without departing from the scope of the disclosure.

Figure 4:
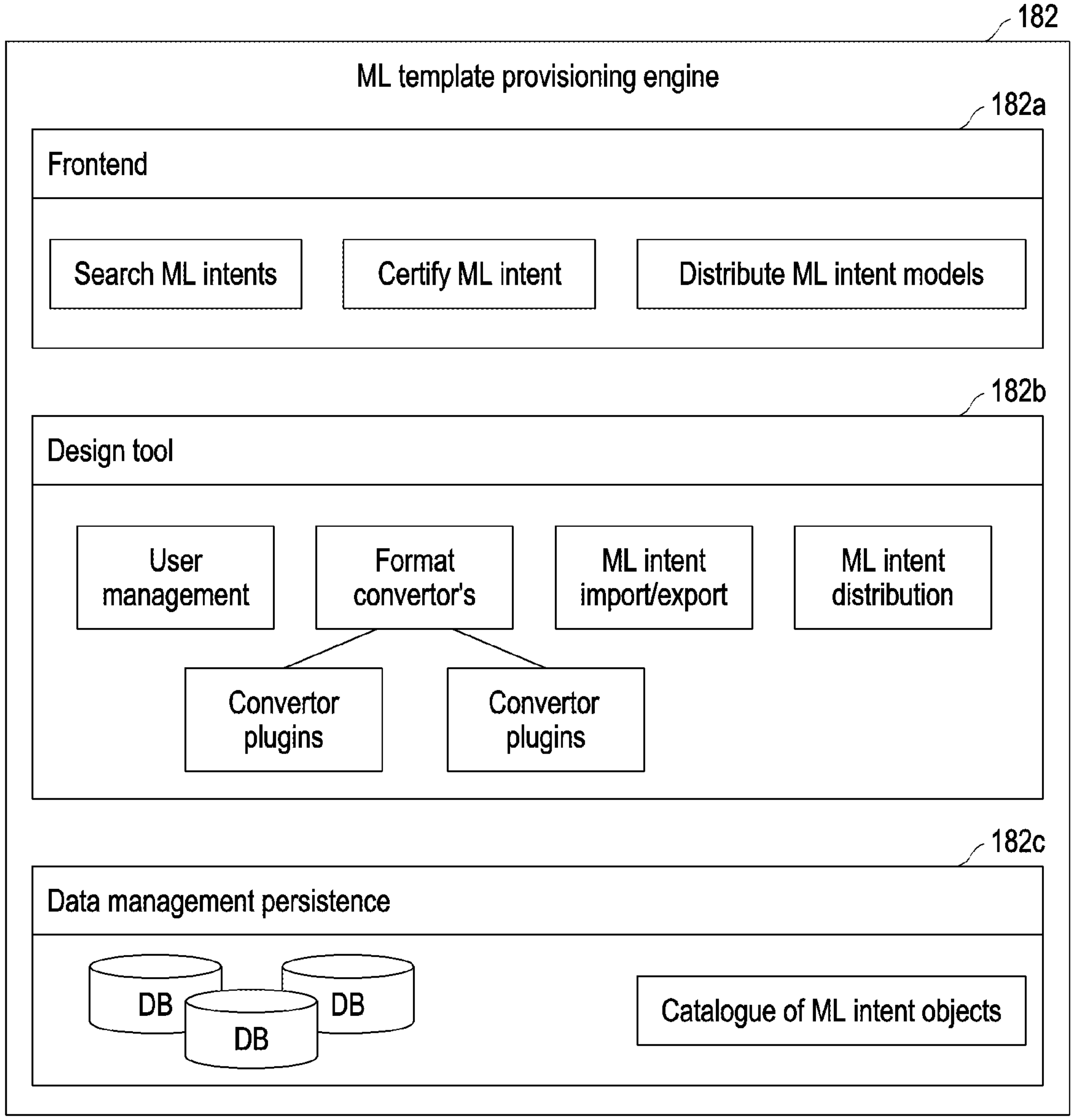
FIG. 4 is a block diagram illustrating an example configuration of an ML template provisioning engine of the ML services management controller, according to various embodiments.

FIG. 4 is a block diagram illustrating an example configuration of the ML template provisioning engine (182) of the ML services management controller (180), according to various embodiments.

Referring to FIG. 4, the ML template provisioning engine (182) is a user interface (UI) based engine that allows a ML designer to create templates for the ML service and store in the memory (120). The various parameters for the ML template can be classified based on the at least one of but not limited to: slice/use case (combination of services)/Network service, region, network traffic pattern classifications, operator policies, current ML resource load and availability in an entire operator network and a KPI list for optimization of the ML service.

Further, the ML template provisioning engine (182) also allows the ML designer to create hierarchal intents for hierarchal services. A ML service request is received at a frontend (182*a*) as per the trigger and passed on to a design tool (182*b*). The design tool (182*b*) certifies the request and checks for the request in the database. Further, the design tool (182*b*) fetches the ML template from the database using ML import/export. The ML service template is converted to a desired format as per the request made using format converters. The ML service template is then exported to ML intent generator through ML intent distribution.

The ML Template examples provide by the ML template provisioning engine (182) includes but are not limited to:

- Type of prediction (e.g., output of the ML model),
- Performance measurements that can be used as input (which can be decided by MLFO based on existing models),
- Locations where AI/ML need to used, hardware/software/cloud resource requirements,
- Real time predictions requirement which decides the location of where the trained model is to be deployed for closed loop optimizations and also if any specific hardware accelerator is required:
  - i) Loop 1 (<10 ms)
  - ii) Loop 2 (>10 ms<1 s)
  - iii) Loop 3 (>1 s)
- Periodicity of the prediction
  - i) Which is required to determine the granularity of the data collected
- Test accuracy
  - i) Low (>90%)
  - ii) High(>95%)
  - iii) Very high (>99%)
- Trained model requirements
  - i) Training and validation accuracy, errors
  - ii) Minimum number of training, validation and test samples required before deployment
  - iii) Allow retraining if models matching the intent is not available
  - iv) Maximum time allowed for the retraining
  - v) Area location data that needs to be considered for training, validation and testing.

Figure 5:
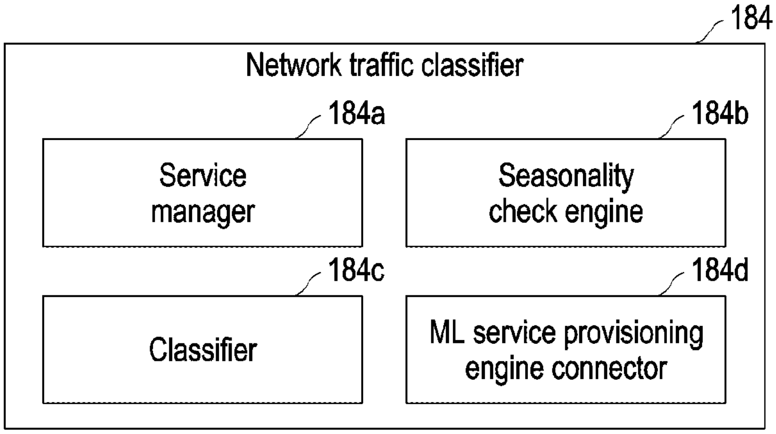
FIG. 5 is a block diagram illustrating an example configuration of a Network traffic classifier of the ML services management controller, according to various embodiments.

FIG. 5 is a block diagram illustrating an example configuration of the network traffic classifier (184) of the ML services management controller (180), according to various embodiments. Referring to FIG. 5, the network traffic classifier (184) includes a service manager (184*a*), a seasonality check engine (184*b*), a classifier (184*c*) and a ML service provisioning engine connector (184*d*), each of which may include various processing circuitry and/or executable program instructions.

The service manager (184*a*) is configured to receive the request for traffic classifier from the operator based on the trigger by a group for different network elements/cells/network circle. The seasonality check engine (184*b*) is configured to check seasonality for each slice or service. The seasonality check engine (184*b*) analyses the data from the group for different network elements/cells/network circle having same behaviour or same traffic patterns and pass the seasonality check results to the classifier (184*c*).

The classifier (184*c*) is configured to bundle the same seasonality nodes and pass instructions to perform training for only one such network element/cell/network circle. Further, the classifier (184*c*) sends instructions to the ML orchestrator (190) to use the same training models for the rest of the network element/cell/network circle in the group. Therefore, the use of the same training helps models for the rest of the network element/cell/network circle saves the ML resources used for training.

The ML service provisioning engine connector (184*d*) is a connector device and is configured to pass on the results from the network traffic classifier (184) to the intelligent ML service provisioning engine (186).

Figure 6:
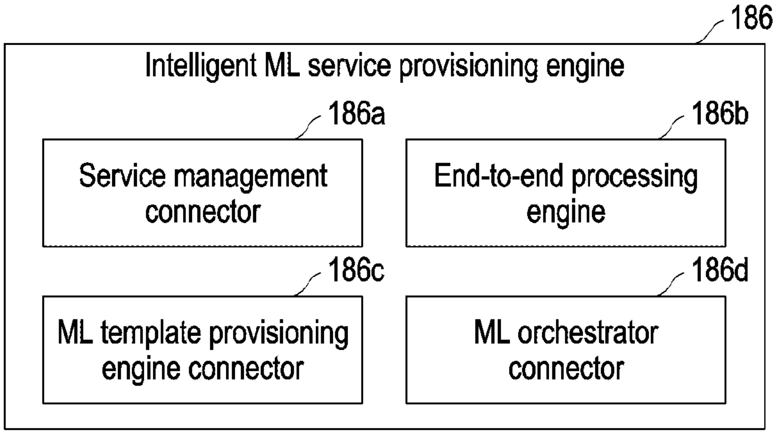
FIG. 6 is a block diagram illustrating an example configuration of an intelligent ML service provisioning engine of the ML services management controller, according to various embodiments.

FIG. 6 is a block diagram illustrating an example configuration of the intelligent ML service provisioning engine (186) of the ML services management controller (180), according to various embodiments. Referring to FIG. 6, the intelligent ML service provisioning engine (186) includes a service management connector (186*a*), an end-to-end processing engine (186*b*), a ML template provisioning engine connector (186*c*) and a ML orchestrator connector (186*d*), each of which may include various processing circuitry and/or executable program instructions.

The service management connector (186*a*) is a connector which is configured to communicate with the NMS to obtain service/slice specific and operator specific configurations. The ML template provisioning engine connector (186*c*) is a connector device which is configured to communicate with the ML template provisioning engine (182) to obtain the available templates for ML service. The ML orchestrator connector (186*d*) is a connector which is configured to communicate with the ML orchestrator (190) to trigger deployment of the ML pipeline based on the ML intent. The end-to-end processing engine (186*b*) is configured to process the end to end flow for generating the Ml service for the requested slice/service.

At operation 1 (refer to FIG. 2), the intelligent ML service provisioning engine (186) receives a Service Profile to create the ML service deployment plan. The Service Profile comprises the service properties such as for example but not limited to slice/service id, location/region and operator policies.

At operation 2 (refer to FIG. 2), the intelligent ML service provisioning engine (186) receives the ML requirements from the operator which includes anomaly id, anomaly type, current ML resource usage for different regions, KPI list for optimization of the service. This is the run time value of the ML resource usage of an operator. The ML resource usage value is expressed in percentage. The operator manages the ML resources across services or across cells with the ML resource usage value. The ML resource usage value is operator specific implementation based on the ML resource allocation and deployments in the operator network.

At operation 3 (refer to FIG. 2), the intelligent ML service provisioning engine (186) also receives the various network traffic patterns classifications and related regions. The network traffic patterns classifications are based on the Service profile coverage area. For example but not limited to, a cell id is used here to get the traffic pattern classification.

At operation 4 (refer to FIG. 2), on receiving the trigger, the ML template provisioning engine (182) shares the ML template as an input. Further, the intelligent ML service provisioning engine (186) also receives the Service Profile, the ML requirements from the operator and the various network traffic patterns classifications and related regions and perform the reinforcement learning or dynamic deep learning to come up with the ML intent. The ML intent includes but is not limited to: the ML model, the ML prediction error window, the ML prediction periodicity, the ML training/prediction accuracies. In parallel, the intelligent ML service provisioning engine (186) also predicts the future ML (hardware, software and cloud) resources in the operator network so that appropriate ML resources is allocated to the current ML task requested by the operator.

The intelligent ML service provisioning engine (186) then generates the ML service deployment plan based on these activities and send the ML service deployment plan to the AI server (190) via ML orchestrator (192).

Figure 7A:
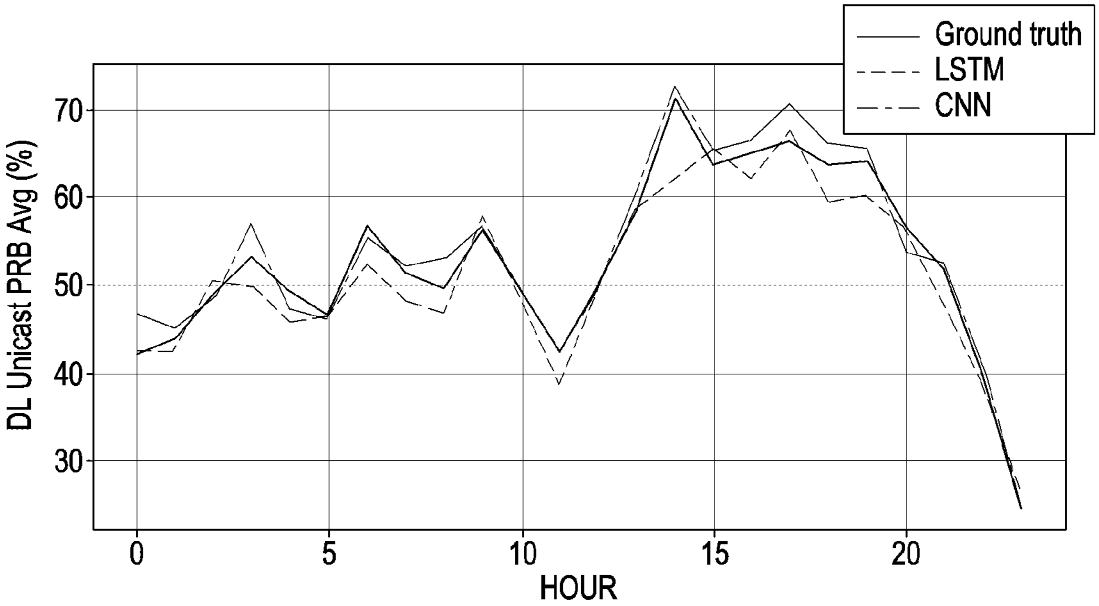
FIG. 7A is a graph illustrating Long short-term memory (LSTM) vs. convolution neural network (CNN) analysis on test data (Cell 8) of 1 day prediction, according to various embodiments.

FIG. 7A is a graph illustrating LSTM vs. CNN analysis on test data (Cell 8) of 1 day prediction, according to various embodiments.

Figure 7B:
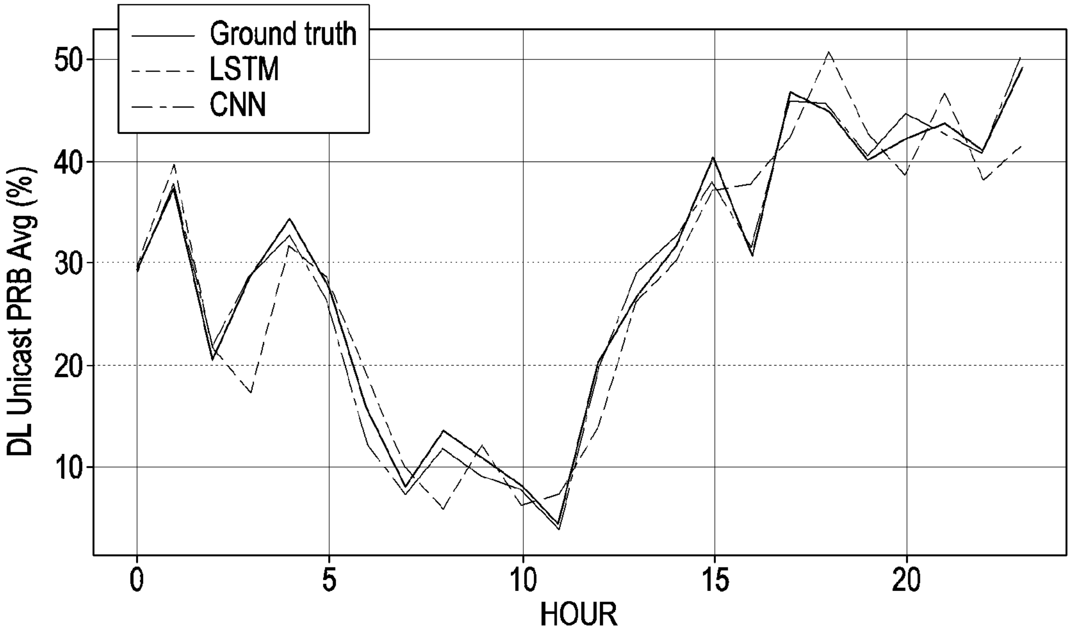
FIG. 7B is a graph illustrating LSTM vs. CNN analysis on test data (Cell 13) of 1 day prediction, according to various embodiments.

FIG. 7B is a graph illustrating LSTM vs. CNN analysis on test data (Cell 13) of 1 day prediction, according to various embodiments.

Generally, the LSTM performs well in majority of the cases and operator might apply LSTM for all the cells. However, in few cases CNN performs well which can compromise QoS or OPEX for specific cells.

Referring to FIG. 7A, in Cell 8, the CNN performs better in terms of accuracy. A ground truth and respective prediction curves are plotted to observe that when there is high utilization of PRBs, the LSTM is not able to predict those particular instances. In such case operator might be required to switch on the higher order multiple input and multiple output (MIMO)s but if the LSTM is not able to predict such high utilizations operator might suffer QoS degradations.

Referring to FIG. 7B in Cell 13 the CNN is observed to be performing better than the LSTM. On plotting the test data graph, the LSTM is observed to be predicting high PRB utilization which might actually not be the case. If the operator relies on the LSTM and applies some mitigation solution in the case when it is not required it compromises on the OPEX.

Figure 8:
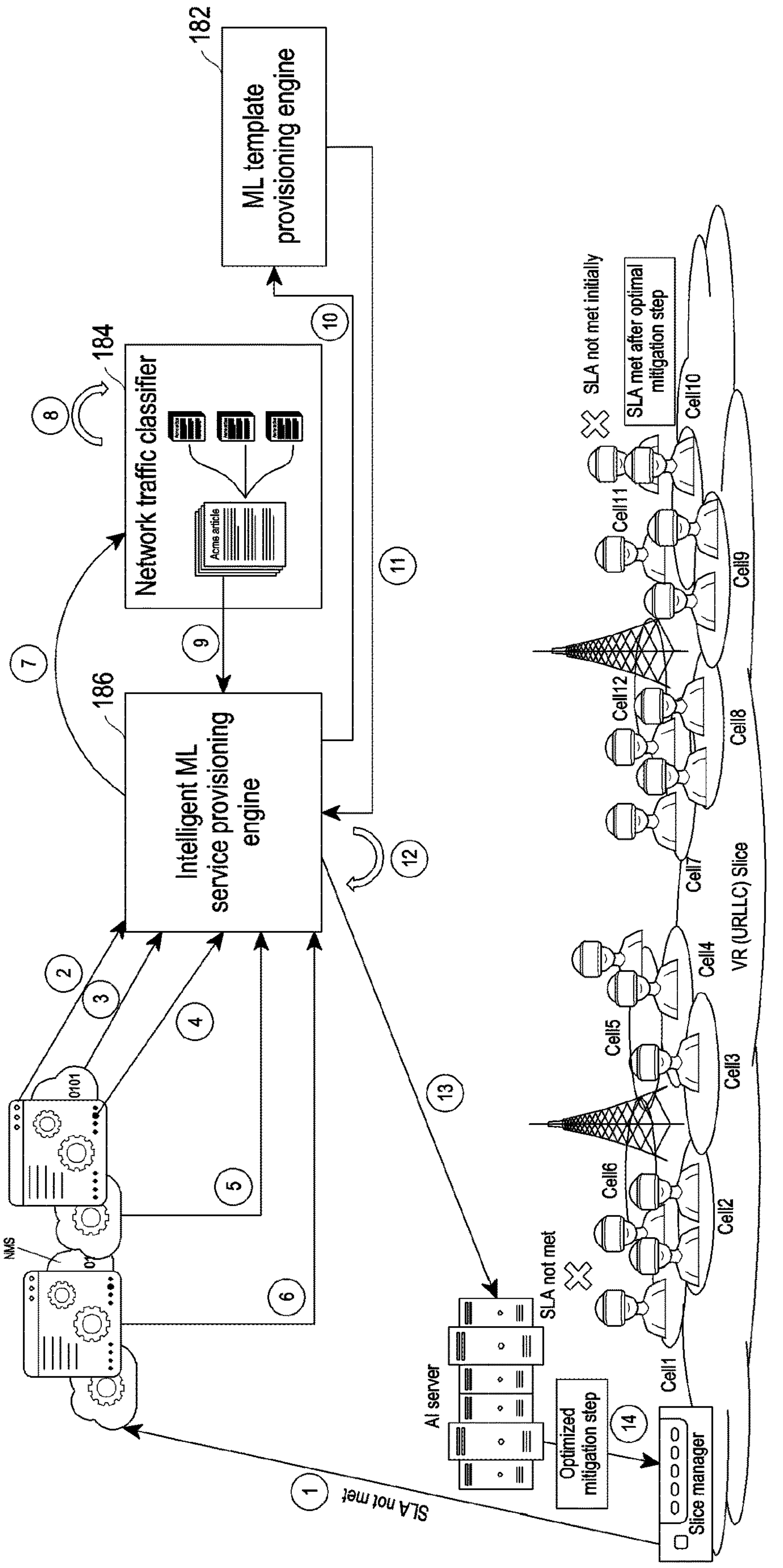
FIG. 8 is a diagram illustrating an example of managing services in the wireless communication network, according to various embodiments.

FIG. 8 is diagram illustrating an example of managing the ML services in the wireless communication network, according to various embodiments.

Referring to FIG. 8, at operation 1, when the SLA of the VR slice is not met, slice manager sends the request to the Network Management system (NMS) informing that the SLA is not met. At operation 2, the NMS of the operator sends the message to the intelligent ML service provisioning engine (186) informing that the VR slice has been initiated since the SLAs for some cells are not met.

At operation 3, the NMS requests the intelligent ML service provisioning engine (186) to deploy the ML pipeline by providing slice type as VR slice and slice id over REST message based interface. At operation 4, the NMS provides the service profile of the VR slice over REST message based interface, based on the slice type and id. The typical service profile of the URLLC may contain for example but not limited to availability: 99.9%, supported device velocity: 2 km/h, slice quality of service parameters (5QI): 82 and coverageAreaTAList:: List of Tracking area where slice is deployed (to help the intelligent ML service provisioning engine (186) to identify the near cell).

At operation 5, on receiving the service profile, the intelligent ML service provisioning engine (186) requests for the current ML resource configuration for URLLC service and current ML usage of the operator from the NMS.

At operation 6, the NMS sends the requested information over REST based interface to the intelligent ML service provisioning engine (182). The shared information may look like the following:

ML model metadata:

i) KPI list: Slice PRB utilization, ii) Per slice number of UEs iii) Model Algorithms: LSTM, ARIMA ML resource utilization allowed: High (30%)

Current ML usage: 80%

Anomaly type: QoS Optimization

Anomaly id: 3

At operation 7, the intelligent ML service provisioning engine (186) requests the network traffic classifier (184) to check the seasonality of the cells covered in the service to determine the network traffic patterns. The intelligent ML service provisioning engine (186) shares some of the information required for the test which are already received as the service profile and the ML resource usage such as in our considered example the intelligent ML service provisioning engine (186) can share the KPI list, tracking area list, the ML resource utilization allowance and the allowed prediction latency.

At operation 8, the network traffic classifier (184) will perform the seasonality check and find groups of cells with similar seasonality. The seasonality information helps the ML orchestrator (192) to deploy only a single instance of training for each cell group instead of performing training for each and every cell. At operation 9, the network traffic classifier (184) provides the requested information back to the intelligent ML service provisioning engine (186) over REST message based interface which may look like the following in case of VR:

List of Cell Groups

Cell group ID 1: {cell 3, 5, 8, 9, 11, 12}, Model: Priority 1: LSTM, priority 2: NN Cell Group ID 2: {cell 1, 2, 4, 6, 7, 10}, Model: Priority 1: ARIMA, priority 2: CNN At operation 10, the intelligent ML service provisioning engine (186) requests for the appropriate template from the ML Template provisioning engine (182) and operation 11 the intelligent ML service provisioning engine (186) receives the appropriate ML template from the ML Template provisioning engine (182).

At operation 12, based on the Service profile, the ML resource utilization and the network traffic pattern classification engine inputs, a further learning is performed by ML Intent Generator engine using the learning models such as the reinforcement learning or the dynamic deep learning.

At operation 13, after learning the appropriate ML Intent will be passed on to the ML orchestrator (192) in the AI server (190) as provided below:

Optimized ML Provisioning::

1. ML resource locations: Training: AI server; Predictions: Near-RT RIC
2. List of cell groups
   Cell group ID 1: {cell 3, 5, 8, 9, 11, 12}, Model: Priority 1: LSTM, priority 2: NN
   Cell Group ID 2: {cell 1, 2, 4, 6, 7, 10}, Model: Priority 1: ARIMA, priority 2: CNN
3. ML prediction periodicity: 1 second
4. ML training and prediction accuracies: 99%
5. Pause ongoing ML training for cell groups: CellgroupID 3: {cell 15, 17}: Service: EMBB At operation 14, the AI server (190) trains and predicts based on the output of the intelligent ML service provisioning engine (186) and send the optimized mitigation solution to the slice manager.

Figure 9:
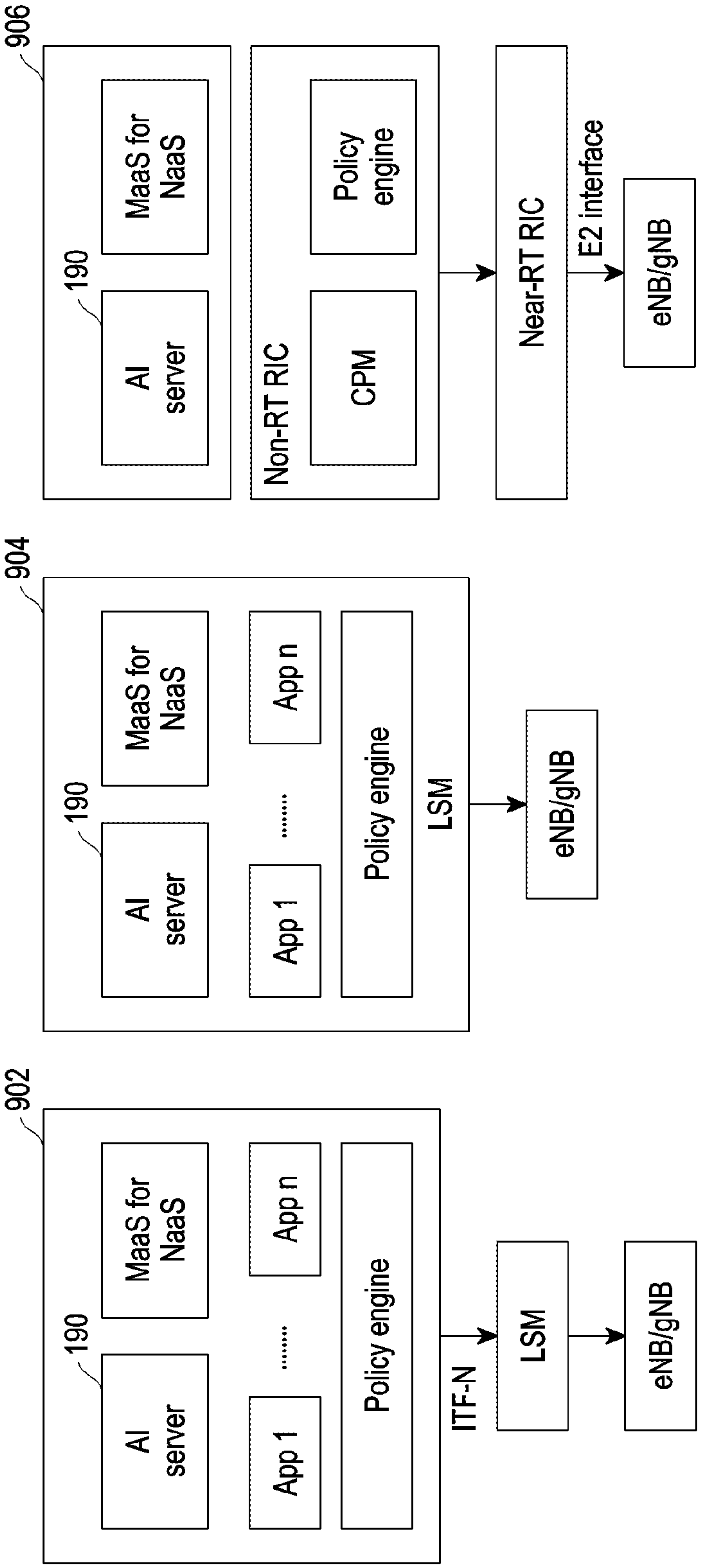
FIG. 9 is a diagram illustrating examples of management of the ML services with different network architectures, according to various embodiments.

FIG. 9 are diagrams illustrating example management of the ML services with different network architectures, according to various embodiments. Referring to FIG. 9, FIG. 9 includes the management of the ML services with different network architectures. At operation 902, the MaaS for NaaS is part of an independent proprietary server solution in which the AI is provided as a service and the MaaS for NaaS further optimizes and automates the AI service.

At operation 904, the MaaS for NaaS is provided as part of LSM with intelligent AI solutions At operation 906, the solution is provided as part of O-RAN solution and co-exist with the AI server (190) as provided in operation 902 and can interact with Non-RT RIC or Near-RT RIC to further optimize the AI solutions.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. A method for managing machine learning (ML) services by an electronic device in a wireless communication network, the method comprising:

storing a plurality of ML packages in memory of the electronic device;

receiving, from a server, a trigger which is generated based on at least one network service request indicating an anomaly corresponding to a network slice;

determining a plurality of parameters corresponding to the at least one network service request, in response to receiving the trigger from the server, wherein the plurality of parameters corresponding to the at least one network service request comprises: information of service profile of a network, ML requirements of at least one network operator, network traffic pattern for a specific service and unfilled ML templates associated with the specific service;

determining at least one ML package from the plurality of ML packages stored in the memory based on the trigger and the plurality of parameters corresponding to the at least one network service request; and deploying the determined at least one ML package for executing the at least one network service request, wherein each of the deployed at least one ML package includes at least one of a predicted requirement of network resources for implementing a ML technique, a predicted ML model, an error prediction window for the predicted ML model, a periodicity of predicting an error for the predicted ML model, and at least one of a training accuracy and a prediction accuracy for the predicted ML model.

2. The method of claim 1, wherein the network traffic pattern for the service is determined by:

receiving the information of service profile of the network and the ML requirements of the at least one network operator as inputs; and determining a plurality of network elements exhibiting same network traffic pattern over a period of time.

3. The method of claim 2, further comprising:

grouping each of the plurality of network elements exhibiting the same network traffic pattern over the period of time;

training one among each of the plurality of network elements exhibiting the same network traffic pattern using a specific training model; and instructing an ML orchestrator to train the remaining plurality of network elements exhibiting the same network traffic pattern using the specific training model used by the ML services management controller for training the one network element, wherein the use of the specific training model used by the ML services management controller for training the one network element, to train the remaining plurality of network elements results in saving of ML resources used for training.

4. The method of claim 1, wherein each of the deployed at least one ML package further comprises at least one of: one or more libraries related to the predicted ML model, or a prediction accuracy for the predicted ML model.

5. The method of claim 1, wherein determining the at least one ML package from the plurality of ML packages based on the trigger and the plurality of parameters corresponding to the at least one network service request comprises:

inputting the trigger received from the server and the plurality of parameters corresponding to the at least one network service request to one of a deep reinforcement leaning engine and deep dynamic learning engine; and determining the at least one ML package of the plurality of ML packages based on the trigger and the plurality of parameters corresponding to the at least one network service request by one of the deep reinforcement leaning engine and the deep dynamic learning engine.

6. The method of claim 4, further comprising:

filling values corresponding to the determined at least one ML package in at least one unfilled ML template associated with the specific service.

7. The method of claim 1, further comprising:

monitoring a plurality of network service requests from the server;

identifying one or more network service requirements associated with each of the network service requests;

monitoring one or more machine learning packages deployed from an ML model repository in response to each of the network service requests from the plurality of network service requests;

generating a co-relation between each of the network service request, the corresponding network service requirements and the one or more machine learning packages deployed from the ML model repository for optimization of each network service over a period of time;

receiving an incoming network service request; and deploying the ML package corresponding to the network service requirements of the incoming network service request based on the generated co-relation.

8. An electronic device for managing machine learning (ML) services in a wireless communication network, the electronic device comprising:

memory storing instructions;

at least one processor coupled to the memory, wherein the instructions, when executed by the at least one processor, cause the electronic device to:

store a plurality of ML packages in the memory;

receive, from a server, a trigger which is generated based on at least one network service request indicating an anomaly corresponding to a network slice;

determine a plurality of parameters corresponding to the at least one network service request, in response to receiving the trigger from the server, wherein the plurality of parameters corresponding to the at least one network service request comprises: information of service profile of a network, ML requirements of at least one network operator, network traffic pattern for a specific service and unfilled ML templates associated with the specific service;

determine at least one ML package from the plurality of ML packages stored in the memory based on the trigger and the plurality of parameters corresponding to the at least one network service request; and deploy the determined at least one ML package for executing the at least one network service request, wherein each of the deployed at least one ML package includes at least one of a predicted requirement of network resources for implementing a ML technique, a predicted ML model, an error prediction window for the predicted ML model, a periodicity of predicting an error for the predicted ML model, and at least one of a training accuracy and a prediction accuracy for the predicted ML model.

9. The electronic device of claim 8, wherein the instructions, when executed by the at least one processor, cause the electronic device to determine the network traffic pattern for the service by:

receiving the information of service profile of the network and the ML requirements of the at least one network operator as inputs; and determining a plurality of network elements exhibiting a same network traffic pattern over a period of time.

10. The electronic device of claim 9, wherein the instructions, when executed by the at least one processor, cause the electronic device further to:

group each of the plurality of network elements exhibiting the same network traffic pattern over the period of time;

train one among each of the plurality of network elements exhibiting the same network traffic pattern using a specific training model; and instruct an ML orchestrator to train rest of the plurality of network elements exhibiting the same network traffic pattern using the specific training model used by the ML services management controller for training the one network element, wherein the use of the specific training model used by the ML services management controller for training the one network element, to train the rest of the plurality of network elements results in saving of ML resources used for training.

11. The electronic device of claim 8, wherein each of the deployed at least one ML packages further comprises at least one of: one or more libraries related to the predicted ML model, and a prediction accuracy for the predicted ML model.

12. The electronic device of claim 8, wherein to determine the at least one ML package from the plurality of ML packages based on the trigger and the plurality of parameters corresponding to the at least one network service request, the instructions, when executed by the at least one processor, cause the electronic device to:

input the trigger received from the server and the plurality of parameters corresponding to the at least one network service request to one of a deep reinforcement leaning engine and deep dynamic learning engine; and determine the at least one ML package of the plurality of ML packages based on the trigger and the plurality of parameters corresponding to the at least one network service request by one of the deep reinforcement leaning engine and the deep dynamic learning engine.

13. The electronic device of claim 12, wherein the instructions, when executed by the at least one processor, cause the electronic device further to:

fill values corresponding to the determined at least one ML package in at least one unfilled ML template associated with the specific service.

14. The electronic device of claim 8, wherein the instructions, when executed by the at least one processor, cause the electronic device further to:

monitor a plurality of network service requests from the server;

identify one or more network service requirements associated with each of the network service requests;

monitor one or more machine learning packages deployed from an ML model repository in response to each of the network service requests from the plurality of network service requests;

generate a co-relation between each of the network service request, the corresponding network service requirements and the one or more machine learning packages deployed from the ML model repository for optimization of each network service over a period of time;

receive an incoming network service request; and deploy the ML package corresponding to the network service requirements of the incoming network service request based on the generated co-relation.

15. A non-transitory computer-readable storage medium storing instructions, wherein the instructions, when executed by at least one processor of an electronic device for managing machine learning (ML) services, cause the electronic device to perform operations comprising:

storing a plurality of ML packages in memory of the electronic device;

receiving, from a server, a trigger which is generated based on at least one network service request indicating an anomaly corresponding to a network slice;

determining a plurality of parameters corresponding to at least one network service request, in response to receiving the trigger from the server, wherein the plurality of parameters corresponding to the at least one network service request comprises: information of service profile of a network, ML requirements of at least one network operator, network traffic pattern for a specific service and unfilled ML templates associated with the specific service;

determining at least one ML package from the plurality of ML packages stored in the memory based on the trigger and the plurality of parameters corresponding to the at least one network service request; and deploying the determined at least one ML package for executing the at least one network service request, wherein each of the deployed at least one ML package includes at least one of a predicted requirement of network resources for implementing a ML technique, a predicted ML model, an error prediction window for the predicted ML model, a periodicity of predicting an error for the predicted ML model, or and at least one of a training accuracy and the prediction accuracy for the predicted ML model.

16. The non-transitory computer-readable storage medium of claim 15, wherein each of the deployed ML package further comprises at least one of: one or more libraries related to the predicted ML model, or a prediction accuracy for the predicted ML model.

* * * * *